(12) United States Patent
Collins et al.

(10) Patent No.: US 7,991,380 B2
(45) Date of Patent: Aug. 2, 2011

(54) GLOBAL BIDIRECTIONAL LOCATOR BEACON AND EMERGENCY COMMUNICATIONS SYSTEM

(75) Inventors: Charles K. Collins, Alexandria, VA (US); Joseph Landa, Alexandria, VA (US)

(73) Assignee: Briar Tek IP, Alexandria, VA (US)

( * ) Notice: Subject to any disclaimer, the term of this patent is extended or adjusted under 35 U.S.C. 154(b) by 985 days.

(21) Appl. No.: 11/693,434

(22) Filed: Mar. 29, 2007

(65) Prior Publication Data

US 2007/0232275 A1 Oct. 4, 2007

Related U.S. Application Data

(60) Provisional application No. 60/788,411, filed on Mar. 30, 2006.

(51) Int. Cl.
*H04M 11/04* (2006.01)

(52) U.S. Cl. ............... 455/404.1; 455/414.4; 455/404.2; 455/3.02; 455/12.1

(58) Field of Classification Search .................. 455/12.1, 455/404.2, 413, 427, 422, 11.1, 404.1, 456.1, 455/414.1, 414.4, 414.3, 412.2, 515, 13.2; 705/3; 340/988, 426, 573.1, 573.4, 572.1, 340/568.1, 825.49, 989
See application file for complete search history.

(56) References Cited

U.S. PATENT DOCUMENTS

| | | | | |
|---|---|---|---|---|
| 4,833,477 A | * | 5/1989 | Tendler | 342/389 |
| 5,497,149 A | * | 3/1996 | Fast | 340/988 |
| 5,598,460 A | * | 1/1997 | Tendler | 455/404.2 |
| 5,914,675 A | * | 6/1999 | Tognazzini | 340/989 |
| 6,083,248 A | * | 7/2000 | Thompson | 607/30 |
| 2003/0137424 A1 | * | 7/2003 | Gehlot et al. | 340/573.4 |
| 2004/0239498 A1 | * | 12/2004 | Miller | 340/539.13 |
| 2005/0239477 A1 | * | 10/2005 | Kim et al. | 455/456.1 |
| 2006/0007038 A1 | * | 1/2006 | Boling et al. | 342/357.1 |
| 2006/0009191 A1 | * | 1/2006 | Malone, III | 455/404.1 |
| 2006/0200842 A1 | * | 9/2006 | Chapman et al. | 725/34 |
| 2007/0057798 A1 | * | 3/2007 | Li et al. | 340/573.1 |
| 2007/0136099 A1 | * | 6/2007 | Neligh et al. | 705/3 |
| 2008/0186135 A1 | * | 8/2008 | Boling et al. | 340/7.51 |
| 2009/0099777 A1 | * | 4/2009 | Roy et al. | 702/6 |

* cited by examiner

*Primary Examiner* — Tan Trinh
(74) *Attorney, Agent, or Firm* — IP Strategies (57) ABSTRACT

An emergency monitoring and reporting system includes a user unit and a monitoring system. The user unit includes an input device, a user satellite communication system, and a user processor communicatively coupled to the input device and the user satellite communication system. The monitoring system includes a monitoring satellite communication system, an output device, and a monitoring processor communicatively coupled to the monitoring satellite communication system and the output device. The user satellite communication system and the monitoring satellite communication system are adapted for mutual communication via a satellite network such that the output device can present information corresponding to information entered at the input device to an observer.

55 Claims, 5 Drawing Sheets

Fig. 7

GLOBAL BIDIRECTIONAL LOCATOR BEACON AND EMERGENCY COMMUNICATIONS SYSTEM

CROSS-REFERENCE TO RELATED APPLICATION

This is related to, and claims the benefit under 35 USC §119(e) of U.S. Provisional Application for Patent No. 60/788,411, which was filed on Mar. 30, 2006.

FIELD OF THE INVENTION

The present invention is related to the monitoring, searching, and rescuing of individuals during emergency situations regardless of their location on the globe.

BACKGROUND OF THE INVENTION

Travelers to remote locations sometimes require the ability to contact rescue authorities in the event of emergencies. Currently, when a traveler is outside the range of traditional telephones, cellular phones, or radios he can either carry a satellite phone or a one-way emergency beacon such as an emergency positioning radio beacon (EPIRB). A problem with satellite phones is that they are typically expensive and are not always set up with the appropriate emergency contact information. A major drawback to standard emergency beacons is that they only operate in one direction. A user pushes an alerting button and the rescue authorities then have to determine the appropriate response with no additional information such as condition of the party and nature of the emergency. A bidirectional communications tool that is capable of sending and receiving short text messages and that can be remotely monitored would help save lives and greatly reduce false alarms and unneeded search and rescue operations.

SUMMARY OF THE INVENTION

According to an aspect of the invention, an emergency monitoring and reporting system includes a user unit and a monitoring system. The user unit includes an input device, a user satellite communication system, and a user processor communicatively coupled to the input device and the user satellite communication system. The monitoring system includes a monitoring satellite communication system, an output device, and a monitoring processor communicatively coupled to the monitoring satellite communication system and the output device. The user satellite communication system and the monitoring satellite communication system are adapted for mutual communication via a satellite network such that the output device can present information to an observer that corresponds to information entered at the input device. Preferably, the satellite network provides substantially global coverage.

The user unit can be adapted to be coupled to a user.

The input device can be adapted to receive text data entered by a user. For example, the input device can be a keypad.

The input device can be adapted to receive voice input from a user. In this case, the user processor can be adapted to convert the voice input to text.

The user unit can also include a memory device in communication with the user processor, and the input device can include an actuator that when selected accesses message data stored in the memory device. Selection of the actuator can cause the accessed message data to be transmitted by the user satellite communication system to the monitor communication system via the satellite network. The message data can include a number of instances of message data, and each data instance can be stored in a respective selectable portion of the memory device. In this case, the input device can include a selection device that is adapted to select one message data instance, and the selected message data instance is transmitted by the user satellite communication system on selection of the actuator. The selection device can be, for example, a scrolling device.

The user satellite communication system can include a transmitter, the input device can be adapted to receive user data from a user, and the user processor can be adapted to format the data for transmission by the transmitter. The monitor satellite communication system can include a receiver that is adapted to receive transmissions from the transmitter via the satellite network, and the monitor processor can be adapted to format the user data received by the receiver for presentation to the observer on the output device. The output device can be adapted to display textual messages and/or audio messages. The output device can include an alarm that is actuated on receipt of the user data by the receiver of the user data. For example, the alarm can include an audio alarm and/or a visual alarm.

The user unit can also include a status sensor that is communicatively coupled to the user processor and that provides a status output. The user processor can be adapted to format the status output for communication from the user unit to the monitoring system via the satellite network. For example, the status sensor can include a motion sensor and/or an accelerometer.

The user unit can also include an output device and the monitor unit can also include an input device. The first satellite communication system can include a user transmitter and a user receiver, and the second satellite communication system can include a monitor transmitter and a monitor receiver. The monitor input device can be adapted to receive textual data entered by the observer at the monitor input device. For example, the monitor input device can be a keypad.

The monitor input device can be adapted to receive voice input from an observer. In addition, the monitor processor can be adapted to convert the voice input to text. The monitoring system can also include a memory device in communication with the monitor processor, and the monitor input device can include an actuator that when selected accesses message data stored in the memory device. Selection of the actuator can cause the message data to be transmitted by the monitor satellite communication system to the user communication system via the satellite network. The message data can include a plurality of instances of message data, and each data instance can be stored in a respective selectable portion of the memory device. The monitor input device can include a selection device that is adapted to access a selected message data instance, and the selected message data instance can be transmitted by the user satellite communication system on selection of the actuator. The selection device can be, for example, a scrolling device.

The user output device can be adapted to display textual messages and/or audio messages. The user output device can include an alarm, such as an audio alarm and/or a visual alarm.

The monitoring system can be adapted to receive information from an information source, via the satellite network or some other channel. For example, the information can be news information, and can include weather advisories. The monitoring system can also include database memory, which can store information such as news information, weather information, and rescue information.

The monitoring system can also include a server, such as a data mining server, which can be adapted to search for and collect travel-related information, via the Internet or over some other channel. The travel-related information can include traveler information, travel advisory information, weather advisory information, and/or rescue authority information. The server can be adapted to organize the collected information according to geographical location. The server can provide the information to the monitoring satellite communication system, and the monitoring satellite communication system can transmit the information to the user satellite communication system via the satellite network. The monitoring satellite communication system can transmit the information to the user satellite communication system according to a timing sequence. For example, the timing sequence can be periodic. Alternatively, the monitoring satellite communication system can transmit the information to the user satellite communication system in response to the occurrence of an event. For example, the event can include an update to the information, or a manual transmission under the control of the observer. The event can also include an indication that the beacon crosses a geographic boundary. The user unit can include a GPS receiver or similar device to determine a geographical location of the user. Geographical data can be sent to the monitoring system for display on the output device, according to a timed sequence or whenever the user crosses a predetermined geographical boundary.

The user unit can include a satellite beacon that transmits a beacon signal according to a timed sequence, and the monitoring system can include a receiver that receives the beacon signal via the satellite network and provides an indication of the presence or absence of the beacon signal at the output device.

According to another aspect of the invention, a method of providing a travel service can include providing the user unit to a user, and monitoring the monitoring system. This method can also include receiving information from an information source at the monitoring system, and transmitting the information to the user unit.

DETAILED DESCRIPTION OF THE INVENTION

In general, the invention is a simple text messaging device that utilizes commercial satellite infrastructure to send and receive short text messages in the event of an emergency. These messages indicate the nature of the emergency and the type of assistance that is required. A user unit carried by the traveler includes a simple text entry device such as a keyboard or touch screen, a display, a processor with onboard memory, and a satellite data modem with appropriate antenna. This text messaging device can be manually operated by the user initiating a message or automatically triggered by a sensor connected to the user unit via an electronic interface, or which is included in the user unit. Alerts at a monitor station can be caused by a user message received at the monitoring station, or by the absence of a message during a pre-arranged time window (dead man's switch).

As an alternative to text messaging, the user unit can include a series of keys that indicate pre-set conditions, so that a general category of the condition of the user is transmitted without the need to key in text. This single-key (or few-key) feature can be included in addition to the keyboard or other text entry device, so that a user can enter a detailed text message when able, and can send a general category message when unable to key text due to the severity of the user's condition, or can provide a first alert to be followed by a detailed message.

The monitoring system includes a computer that can communicate with the satellite system and a database of both rescue groups and news alerts such as dangerous weather conditions that are sent to remote travelers to help prevent an emergency situation from developing. The invention also includes monitoring of the beacons for alert conditions such as when a use pushes a panic button or if a sensor causes an alarm. The monitoring computer can also relay messages to designated recipients, such as emergency personnel.

Figure 1:
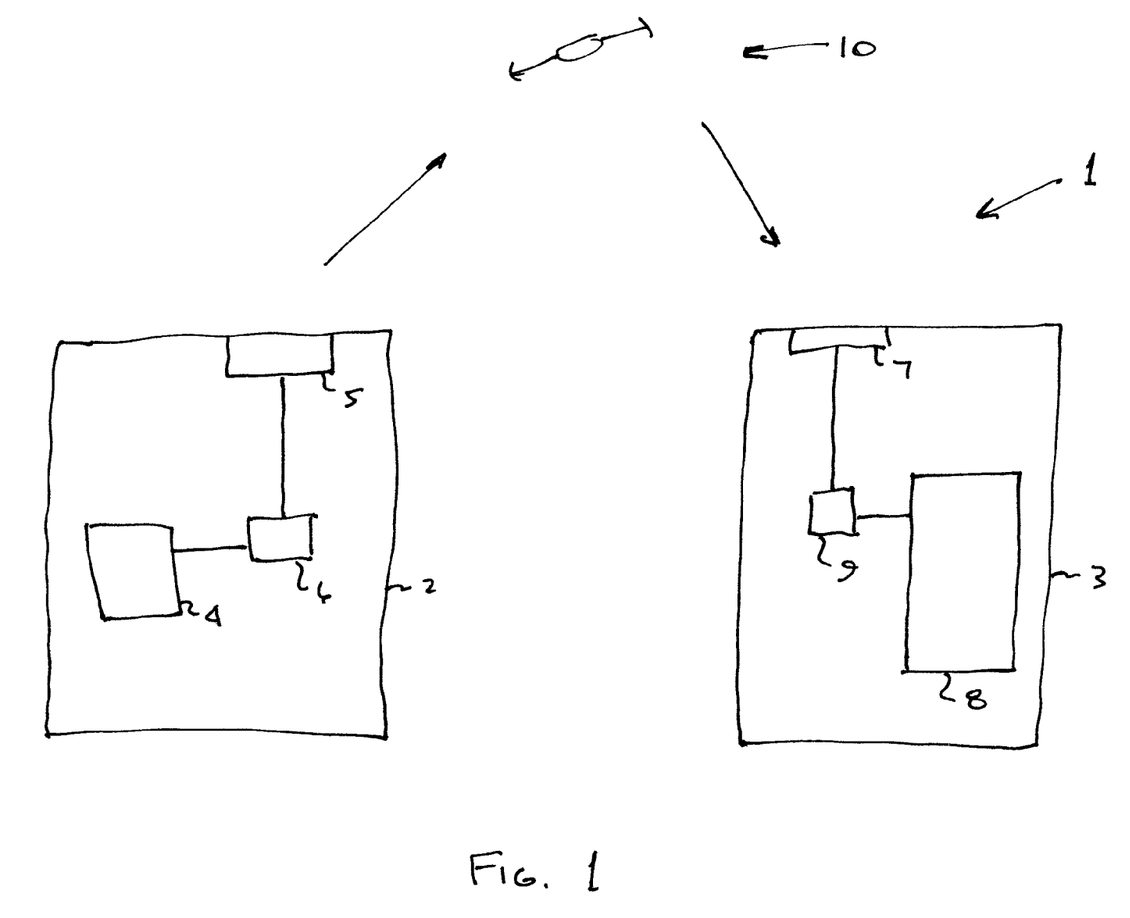
FIG. 1 is a block diagram of an exemplary emergency monitoring and reporting system according to the invention.

As shown in FIG. 1, an emergency monitoring and reporting system 1 according to the invention includes a user unit 2 and a monitoring system 3. The user unit 2 includes an input device 4, a satellite communication system 5, and a processor 6 that is communicatively coupled to the input device 4 and the satellite communication system 5. The monitoring system 3 includes a satellite communication system 7, an output device 8, and a processor 9 that is communicatively coupled to the satellite communication system 7 and the output device 8. The system components are supplied with appropriate power, for example, by providing AC power to the monitoring system and a battery or fuel cell to the user unit. The user satellite communication system 5 and the monitoring satellite communication system 7 include all the hardware, firmware, and software necessary for mutual communication via a satellite network 10, including a modem and antenna. Communicating via the satellite network 10, the output device 8 at the monitoring system 3 can present information entered at the input device 4 of the user unit 2, or information corresponding to an input action taken by the user, to an observer at the monitoring system 3. The input device 4 receives user data from a user and the processor 6 formats the data for transmission by the satellite communication system 5 transmitter. The monitor processor 9 formats the user data received by the receiver of the monitor satellite communication system 7, for presentation to the observer at the output device 8. Optionally, the monitoring system can also include a relay transmitter, so that messages from the user can be relayed directly to response personnel. Preferably, the satellite network provides substantially global coverage, although in some applications more limited coverage is adequate.

Figure 2:
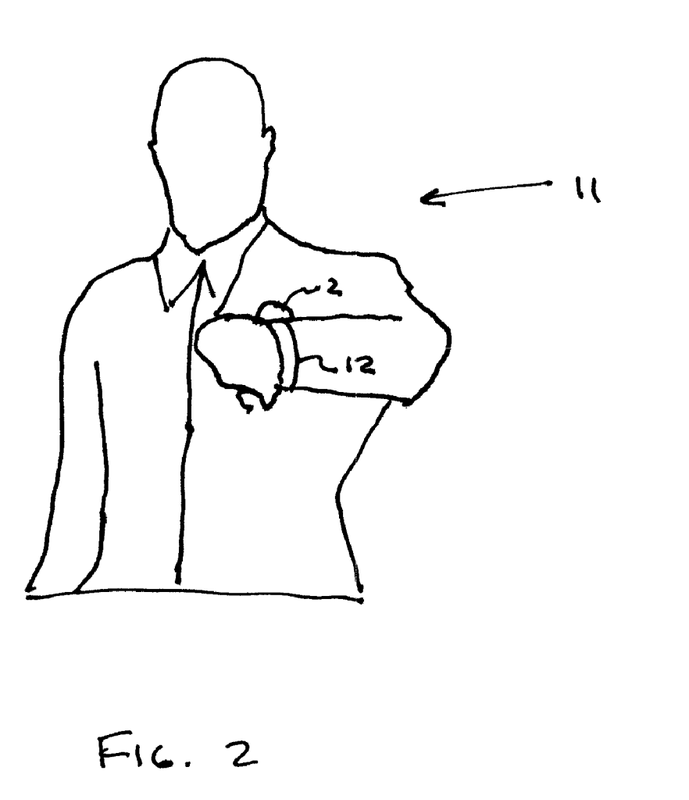
FIG. 2 is a rendering of an exemplary user unit, shown worn by a user.

As shown in FIG. 2, the user unit 2 can be adapted to be coupled to or worn by a user 11, through the use of a strap, a clip, a hook-and-loop fastener, or any other known removable fastening implement 12. The fastening implement 12 can be used to attach the user unit 2 to the user 11, such as by providing an armband to hold the user unit 2, or to attach the user unit 2 to the user's clothing or other equipment, such as by providing an belt clip or pocket clip for holding the user unit 2. If the particular embodiment of the user unit 2 is small enough, it can be strapped to the user's wrist, much like a wristwatch. Larger user units can be worn much like a PDA, cell phone, or pager, using a similar clip-on holder. Alternatively, the user unit 2 can be carried by the user, for example, in a pocket, backpack, or briefcase.

Figure 3:
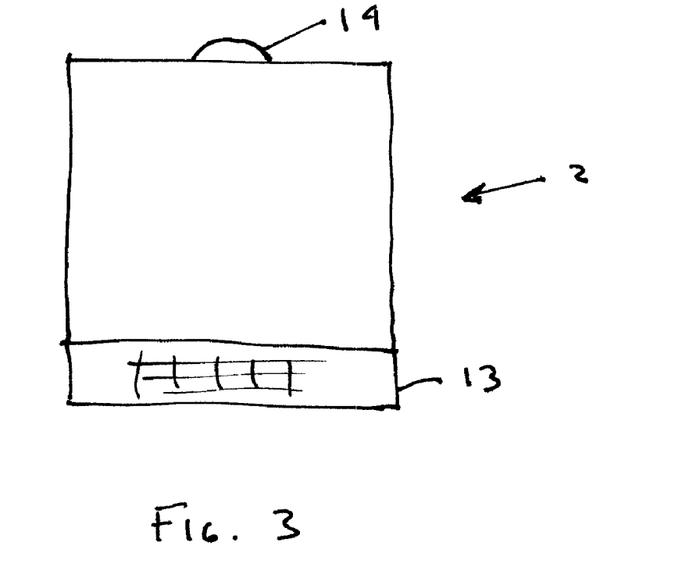
FIG. 3 is a block diagram of an exemplary user unit.

The input device 4 can be any device that can accept an input entered by the user that can be processed by the user unit 2. This input can be textual, audible, or any other type of communication. For example, the input device 4 can be a keypad 13 or a microphone 14, or can include both a keypad 13 and a microphone 14, as shown in FIG. 3. If the input device 4 accepts a voice input, the message can be transmitted as a voice signal, or certain embodiments can include voice-to-text software so that the processor 6 can convert the voice input to text prior to transmission by the satellite communication system 5. Other types of input devices, such as touch screens and pressure sensitive writing tablets can be used with the system 1. Such an input device allows the user to compose a message that is particular to the situation being experience. Preferably, each transmission of a message by the user will include a header or other field that includes a user identifier, such as an ID number, for embodiments in which the system 1 is monitoring more than one user unit 2. This user identifier is presented at the output device 8 along with the message.

Figure 4:
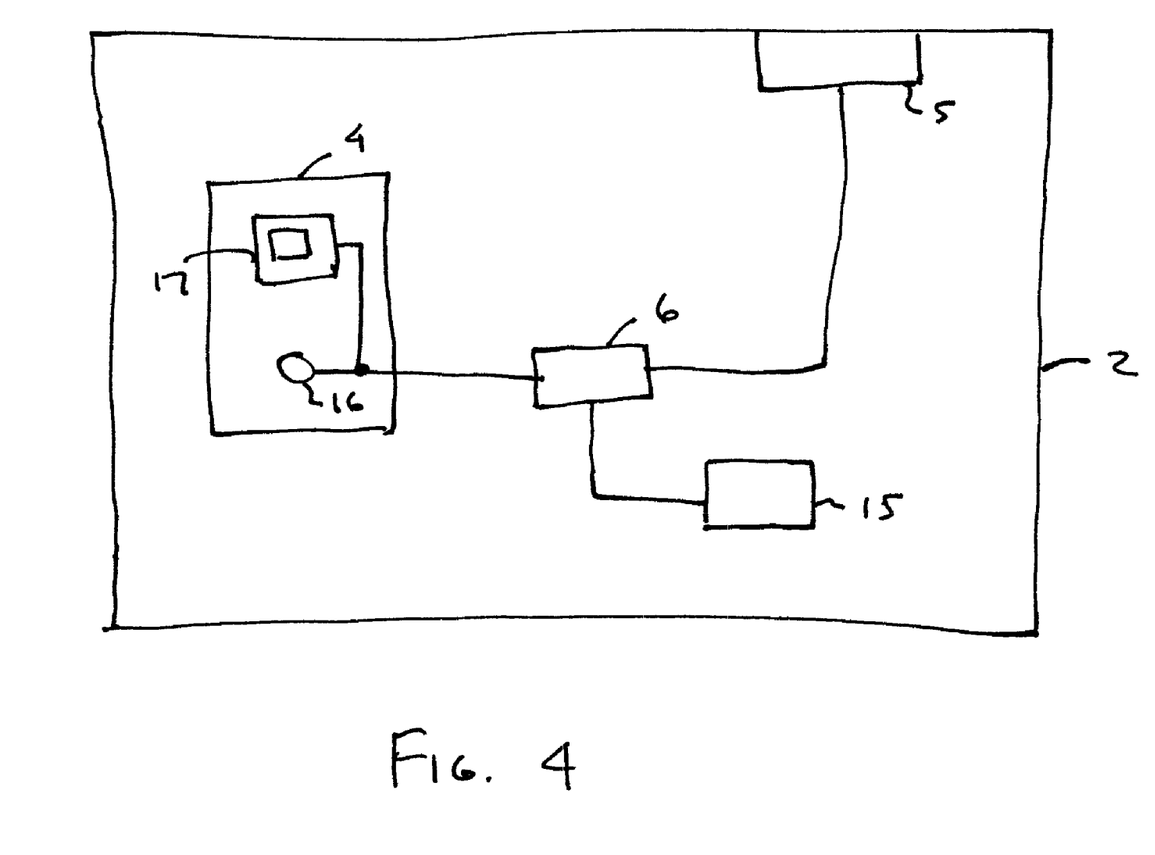
FIG. 4 is a block diagram of an exemplary user unit.

The user unit 2 can also be used to transmit a pre-recorded message that is appropriate for the user's situation. For example, as shown in FIG. 4, a memory device 15 in communication with the processor 6 can store the message, such as "MEDICAL EMERGENCY". The input device 4 according to this embodiment includes an actuator 16, such as a switch that when depressed accesses the message data stored in the memory device 15. Depression of the actuator 16 causes the accessed message data to be transmitted by the satellite communication system 5 so that the prerecorded message can be read at the monitoring station. This feature can be provided instead of the message composition feature, or in addition, so that a quick alert can be sent, to be followed by a detailed message.

The input device 4 can also include an image capturing device, such as a still camera or video camera, in which case the output device 8 includes a monitor for displaying sent images. Such images can be useful to the observer or to response personnel in, for example, evaluating a medical condition or helping to direct a lost traveler.

In some embodiments of the invention, the memory device 15 stores a number of different messages, and the input device 4 includes a selection device 17, such as a scrolling device, multiple key device, or touch-sensitive screen, that the user can utilize to select an appropriate message. These prerecorded messages can correspond, for example, to categories of alerts, the sending of one of which will be followed by a detailed message. The selected message is then transmitted by the satellite communication system 5 on depression of the actuation device 16, which can be a separate device or which can be integrated into the selection device 17.

Figure 5:
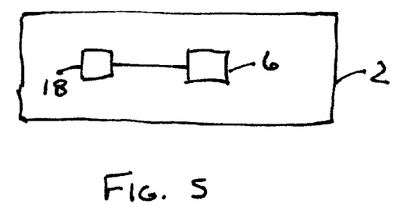
FIG. 5 is a block diagram of an exemplary user unit.

Particular embodiments of the user unit 2 also include a status sensor 18 that is communicatively coupled to the processor 6, as shown in FIG. 5. The status sensor 18 determines the presence or absence of a status parameter, and/or a value of that parameter, and provides a status output 19 to the processor 6. The processor 6 formats the status output 19 for transmission by the satellite communication system 5, so that an observer receiving the user information at the monitoring system 3 has an indication of the parameter value. Different sensors can be used, alone or in combination, depending on the status parameters of interest. For example, the status sensor 18 can include a motion sensor, so that a lack of motion can be observed at the monitoring system, possibly indicating a problem by indicating the presence or absence of the motion parameter. The status sensor 18 can include an accelerometer, instead of or in addition to the motion sensor or other status sensor, which might indicate a fall if the accelerometer detects motion exceeding a predetermined acceleration threshold as the parameter value. The sensor can also sense and indicate biological information such as heart rate and body temperature, to be used by remote medical personnel so that a medical emergency can be analyzed even before personnel reach the user.

Figure 6:
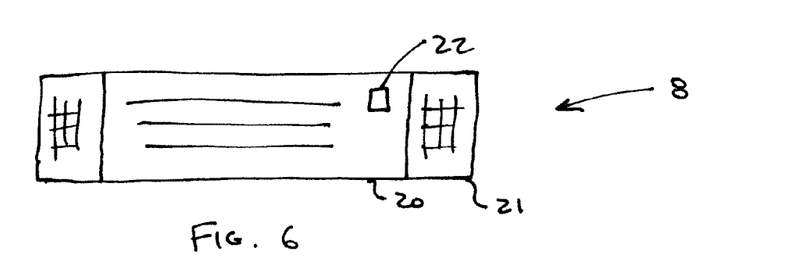
FIG. 6 is a diagram of an exemplary output device.

The output device 8 displays textual messages and/or audio messages, corresponding to the format of the message sent by the user unit 2. As shown in FIG. 6, an exemplary embodiment of the output device 8 includes a text display 20 for displaying textual messages, such as an LCD display, and audio speakers 21 for providing voice messages or audio alarms. The output device can also indicate a visual alarm by flashing the text display 20, or by flashing a dedicated visual alarm indicator 22, such as an LED. The alarm can indicate that there is an incoming message, or that the category of message is an emergency alert. In either case, the alarm might be followed by a detailed message, if the user is able to compose and send one. The output device can be a portable device that communicates wirelessly with the rest of the monitoring system, to provide mobility for the observer while maintaining continuous contact with the user.

Figure 7:
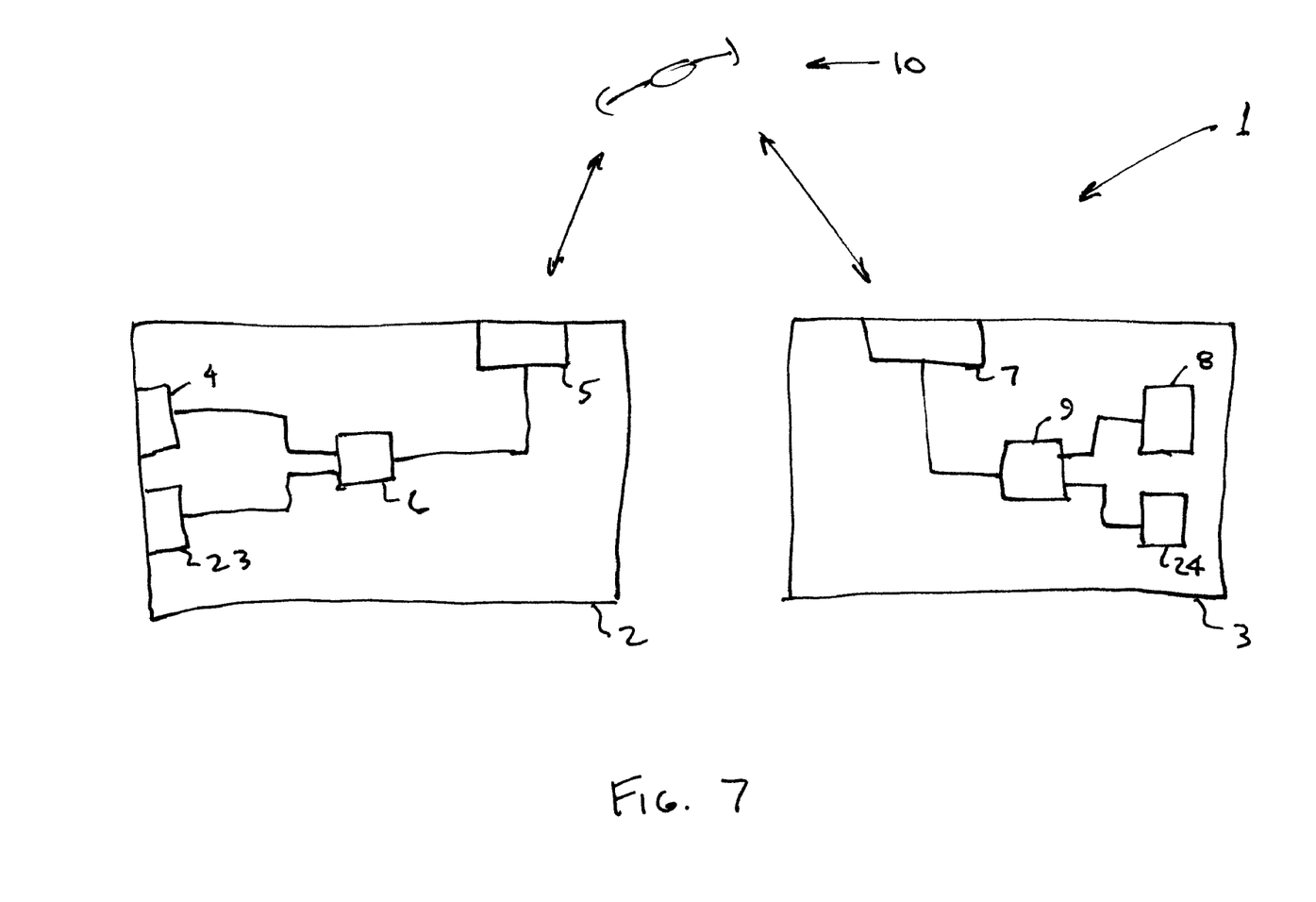
FIG. 7 is a block diagram of an exemplary emergency monitoring and reporting system.

As shown in FIG. 7, certain embodiments of the invention provide for two-way communication between the user unit 2 and the monitoring system 3. As in the embodiment shown in FIG. 1, the system 1 includes a user unit 2 and a monitoring unit 3. The user unit 2 includes an input device 4, a satellite communication system 5, and a processor 6 communicatively coupled to the input device 4 and the satellite communication system 5, as well as an output device 23 at which messages from the monitoring system 3 are provided for the user. Likewise, the monitoring system 3 includes a satellite communication system 7, an output device 8, and a processor 9 communicatively coupled to the satellite communication system 7 and the output device 8, as well as an input device 24 by which messages and/or information are provided, to be transmitted to the user. In this embodiment, each satellite communication system 5, 7 includes both a transmitter and a receiver, to enable two-way communication. This embodiment of the system 1 allows an observer at the monitoring system 3 to reply to a user, in order to acknowledge that the user's message has been received, to request additional information, or for any other purpose. The user unit output device 23 includes any or all of the features of the monitoring system output device 8, and the monitoring system input device 24 includes any or all of the features of the user unit input device 4, as described above.

Figure 8:
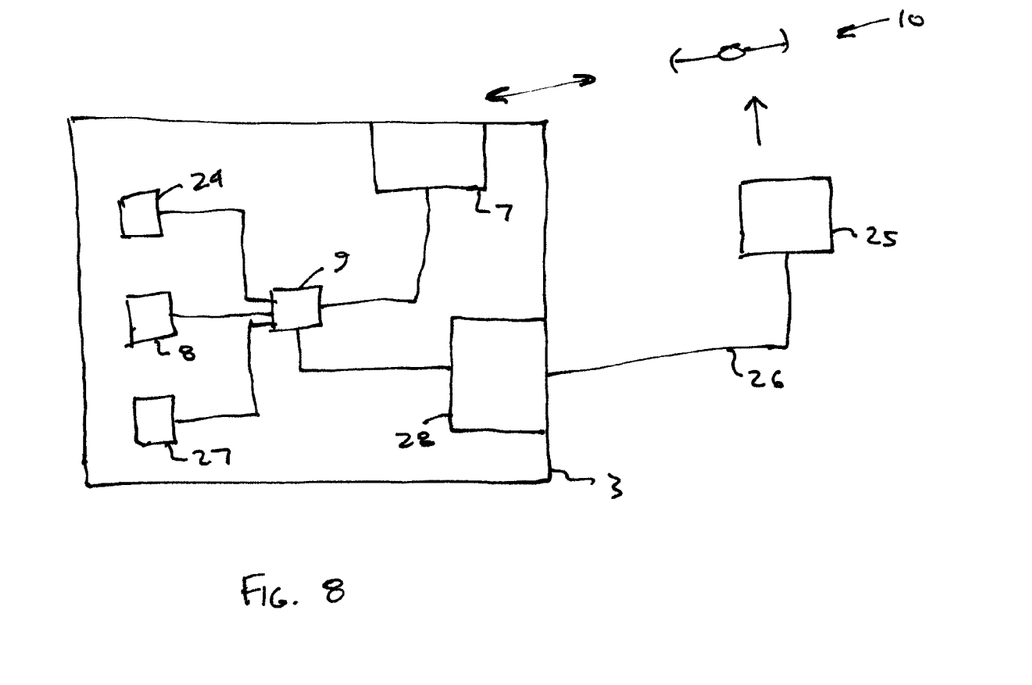
FIG. 8 is a block diagram of an exemplary monitoring system.

As shown in FIG. 8, certain embodiments of the monitoring system 3 receives information from an information source 25. This information can be received at the satellite communication system 7, via the satellite network 10, or it can be provided via some other channel, such as over a cable link 26. This information can be news information, such as weather advisories, rescue information, or other information that is useful to travelers, outdoorsmen, or anyone else using the system 1. The monitoring system 3 can also include database memory 27, which can store the received information and data, messages, or annotations entered by the observer at the input device 24. The database memory can store other information as well, such as medical emergency information or user information manually entered by the observer at the input device.

As shown in FIG. 8, certain embodiments of the monitoring system also include a server 28, such as a data mining server, which searches for and collects travel-related information or other information that would be useful to the user. For example, the server can tap into news agency information available via the satellite network 10, or can subscribe to a cable news service, or can search for relevant information via the Internet. The travel-related information can include traveler information, travel advisory information, weather advisory information, and/or rescue authority information, which will be of use to the observer at the monitoring system 3 in determining risks and other factors associated with the user, as well as general geographic information that can be sent to lost travelers. The server, under the control of the processor 9 or its own internal processor, can sort and organize the collected information according to geographical location or any other category specified by the observer at the observer's discretion or the user's request.

The monitoring system 3 transmits the information gathered by the server 28, preferably after storage in the database memory 27, to the user unit 2 via the satellite network 10. The observer can parse the information, either automatically according to the categorization criteria or manually, to transmit information that is particularly relevant to the user. This information is then "pushed" to the user. The information can be transmitted to the user according to a timing sequence, such as periodically, in response to the occurrence of an event, or at the discretion of the observer. For example, the information can be transmitted at the top of every hour, every time relevant information is updated at the monitoring system 3, in response to a request by the user, or on detection of a change in status of the user.

The user unit 2 can include a satellite beacon that transmits a beacon signal according to a timed sequence, such as periodically, and the monitoring system 3 can include a receiver that receives the beacon signal via the satellite network 10 and provides an indication of the presence or absence of the beacon signal at the output device 8. The beacon signal can also carry an identification field, so that a number of users can be tracked individually at the monitoring system 3. In the embodiments shown herein, it is assumed that the beacon can be provided using the hardware that has already been described. That is, the processor 6 can be used to generate pulses or other signals necessary to transmit the satellite beacon signal from the satellite communication system 5, and the monitor processor 9 can recognize this beacon signal after reception by the satellite communication system 7 and can process the signal for presentation at the output device 8, which can include a dedicated beacon field or which can transparently monitor beacon signals and only display user IDs for beacons that are not detected. It is contemplated, however, that the system 1 can include dedicated circuitry to provide, detect, and present an indication of the beacon signal. The beacon can be linked to a GPS system, so that the location of the user can be tracked as his or her presence is monitored.

It is also contemplated that the system of the invention can be provided as a travel service, by providing the user unit to a user, such as a traveler, particularly to a traveler in an outdoor or remote setting, and monitoring the monitoring system for the user and possibly other users as well. The user unit can be rented to users, who will be charged for use of the unit and/or the service of monitoring the user. Alternatively, the user unit can be sold, with different models including different features as described herein. The user can then purchase connection time with the monitoring system, either on a continuous basis or for particular periods during which the system will be used. Monitoring personnel at the monitoring system would then watch for messages from the user, "push" appropriate information to the user, and take action if necessary.

We claim:

1. An emergency monitoring and reporting system, comprising:
    a user unit; and
    a monitoring system;
    wherein the user unit includes an input device, a user satellite communication system, and a user processor communicatively coupled to the input device and the user satellite communication system;
    wherein the monitoring system includes a monitoring satellite communication system, an output device, and a monitoring processor communicatively coupled to the monitoring satellite communication system and the output device;
    wherein the user satellite communication system and the monitoring satellite communication system are adapted for mutual communication via a satellite network such that the output device can present information to an observer, wherein the information corresponds to information entered at the input device; and
    wherein the input device includes a text entry device adapted to receive textual data entered by a user.

2. The system of claim 1, wherein the user unit is adapted to be coupled to a user.

3. The system of claim 1, wherein the input device is adapted to receive voice input from a user.

4. The system of claim 3, wherein the user processor is adapted to convert the voice input to text.

5. The system of claim 1, wherein the user unit further includes a memory device in communication with the user processor, and the input device includes an actuator that when selected accesses message data stored in the memory device.

6. The system of claim 5, wherein selection of the actuator causes the accessed message data to be transmitted by the user satellite communication system to the monitor communication system via the satellite network.

7. The system of claim 6, wherein the message data includes a plurality of instances of message data, wherein each data instance of said plurality of data instances is stored in a respective selectable portion of the memory device.

8. The system of claim 7, wherein the input device includes a selection device that is adapted to select one message data instance from among the plurality of data instances, wherein the selected one message data instance is transmitted by the user satellite communication system on selection of the actuation device.

9. The system of claim 8, wherein the selection device is a scrolling device.

10. The system of claim 1, wherein the user satellite communication system includes a transmitter, and wherein the input device is adapted to receive user data from a user and the user processor is adapted to format the data for transmission by the transmitter.

11. The system of claim 10, wherein the monitor satellite communication system includes a receiver that is adapted to receive transmissions from the transmitter via the satellite network, and wherein the monitor processor is adapted to format the user data received by the receiver for presentation to the observer on the output device.

12. The system of claim 11, wherein the output device is adapted to display textual messages.

13. The system of claim 11, wherein the output device is adapted to play audio messages.

14. The system of claim 11, wherein the output device includes an alarm that is actuated on receipt of the user data by the receiver of the user data.

15. The system of claim 14, wherein the alarm includes an audio alarm.

16. The system of claim 14, wherein the alarm includes a visual alarm.

17. The system of claim 1, wherein the user unit further includes a status sensor that is communicatively coupled to the user processor and that provides a status output, wherein the user processor is adapted to format the status output for communication from the user unit to the monitoring system via the satellite network.

18. The system of claim 17, wherein the status sensor includes at least one of a motion sensor and an accelerometer 19. The system of claim 1, wherein
the input device is a user input device,
the output device is a monitor output device,
the user unit further includes a user output device,
the monitor unit includes a monitor input device,
the first satellite communication system includes a user transmitter and a user receiver, and
the second satellite communication system includes a monitor transmitter and a monitor receiver.

20. The system of claim 19, wherein the monitor input device is adapted to receive textual data entered by the observer at the monitor input device.

21. The system of claim 20, wherein the monitor input device is a keypad.

22. The system of claim 19, wherein the monitor input device is adapted to receive voice input from an observer.

23. The system of claim 22, wherein the monitor processor is adapted to convert the voice input to text.

24. The system of claim 19, wherein the monitoring system further includes a memory device in communication with the monitor processor, and the monitor input device includes an actuator that when selected accesses message data stored in the memory device.

25. The system of claim 24, wherein selection of the actuator causes the message data to be transmitted by the monitor satellite communication system to the user communication system via the satellite network.

26. The system of claim 25, wherein the message data includes a plurality of instances of message data, wherein each data instance of said plurality of data instances is stored in a respective selectable portion of the memory device.

27. The system of claim 26, wherein the monitor input device includes a selection device that is adapted to access a selected one message data instance from among the plurality of data instances, wherein the selected one message data instance is transmitted by the user satellite communication system on selection of the actuation device.

28. The system of claim 27, wherein the selection device is a scrolling device.

29. The system of claim 19, wherein the user output device is adapted to display textual messages.

30. The system of claim 29, wherein the user output device is adapted to play audio messages.

31. The system of claim 29, wherein the user output device includes an alarm.

32. The system of claim 31, wherein the alarm is an audio alarm.

33. The system of claim 31, wherein the alarm is a visual alarm.

34. The system of claim 1, wherein the satellite network provide substantially global coverage.

35. A method of providing a travel service, comprising:
providing the user unit of claim 1 to a user; and
monitoring the monitoring system of claim 1.

36. An emergency monitoring and reporting system, comprising:
a user unit; and
a monitoring system;
wherein the user unit includes an input device, a user satellite communication system, and a user processor communicatively coupled to the input device and the user satellite communication system;
wherein the monitoring system includes a monitoring satellite communication system, an output device, and a monitoring processor communicatively coupled to the monitoring satellite communication system and the output device;
wherein the user satellite communication system and the monitoring satellite communication system are adapted for mutual communication via a satellite network such that the output device can present user information to an observer, wherein the user information corresponds to information entered at the input device; and
wherein the monitoring system is adapted to receive external information from an information source via the satellite network and to provide at least a portion of the external information to the user unit, wherein the at least a portion of the external information is particularly relevant to a geographical location of a user corresponding to the user unit.

37. The system of claim 36, wherein the information is news information.

38. The system of claim 37, wherein the news information includes weather advisories.

39. The system of claim 36, wherein the monitoring system further includes database memory.

40. The system of claim 39, wherein the database memory stores news information.

41. The system of claim 39, wherein the database memory stores weather information:

42. The system of claim 39, wherein the database memory stores rescue information.

43. The system of claim 36, wherein the monitoring system further includes a server.

44. The system of claim 43, wherein the server is a data mining server.

45. The system of claim 44, wherein the data mining server is adapted to search for and collect travel-related information.

46. The system of claim 45, wherein the data mining server is adapted to search for information via the Internet.

47. The system of claim 45, wherein the travel-related information includes at least one of traveler information, travel advisory information, weather advisory information, and rescue authority information.

48. The system of claim 47, wherein the server is adapted to organize the collected information according to geographical location.

49. The system of claim 45, wherein the server provides the information to the monitoring satellite communication system, and the monitoring satellite communication system transmits the information to the user satellite communication system via the satellite network.

50. The system of claim 49, wherein the monitoring satellite communication system transmits the information to the user satellite communication system according to a timing sequence.

51. The system of claim 50, wherein the timing sequence is periodic.

52. The system of claim 50, wherein the monitoring satellite communication system transmits the information to the user satellite communication system in response to the occurrence of an event.

53. The system of claim 52, wherein the user unit includes a satellite beacon that transmits a beacon signal according to a time sequence, and the monitoring system includes a receiver that receives the beacon signal via the satellite network and provides an indication of at least one of the presence and absence of the beacon signal at the output device.

54. The system of claim 53, wherein the event includes at least one of an update to the information, under the control of the observer, and when the beacon crosses a predetermined geographical boundary.

55. A method of providing a travel service, comprising:
providing the user unit of claim 49 to a user;
monitoring the monitoring system of claim 49; and
transmitting the information to the user satellite communication system via the satellite network.

* * * * *